(12) United States Patent
Vasseur et al.

(10) Patent No.: US 11,711,291 B2
(45) Date of Patent: Jul. 25, 2023

(54) PROGRESSIVE AUTOMATION WITH PREDICTIVE APPLICATION NETWORK ANALYTICS

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 17/238,440

(22) Filed: Apr. 23, 2021

(65) Prior Publication Data
US 2022/0345394 A1 Oct. 27, 2022

(51) Int. Cl.
*H04L 45/00* (2022.01)
*H04L 45/02* (2022.01)

(52) U.S. Cl.
CPC ........... *H04L 45/14* (2013.01); *H04L 45/08* (2013.01)

(58) Field of Classification Search
CPC ........... H04L 41/0663; H04L 41/0886; H04L 41/145; H04L 41/147; H04L 41/16; H04L 41/50; H04L 41/5003; H04L 41/5009; H04L 41/5019; H04L 41/5025; H04L 41/5038; H04L 41/5048; H04L 45/08; H04L 45/14; H04L 45/22; H04L 45/28; H04L 45/64; H04L 47/127; H04L 47/2425; G06N 20/00
See application file for complete search history.

(56) References Cited

U.S. PATENT DOCUMENTS

| | | | |
|---|---|---|---|
| 8,488,471 B2 | 7/2013 | Sadler et al. | |
| 10,389,585 B2 | 8/2019 | Mizrachi | |
| 2015/0195149 A1* | 7/2015 | Vasseur | G06N 7/005 370/252 |
| 2017/0230267 A1 | 8/2017 | Armolavicius et al. | |
| 2020/0313979 A1* | 10/2020 | Kumaran | H04L 41/16 |
| 2020/0314022 A1 | 10/2020 | Vasseur et al. | |
| 2020/0379839 A1* | 12/2020 | Savalle | G06F 11/0793 |
| 2020/0382385 A1* | 12/2020 | Vasseur | H04L 43/08 |
| 2020/0382414 A1* | 12/2020 | Vasseur | H04L 41/5025 |
| 2020/0389371 A1* | 12/2020 | Tedaldi | H04L 45/64 |
| 2021/0231447 A1* | 7/2021 | Ahmed | H04W 28/24 |

OTHER PUBLICATIONS

Mohammed, et al., "Machine Learning and Deep Learning Based Traffic Classification and Prediction in Software Defined Networking", 2019 IEEE International Symposium on Measurements & Networking (M&N), Jul. 2019, 6 pages, IEEE, Catania, Italy.

* cited by examiner

*Primary Examiner* — Kan Yuen
(74) *Attorney, Agent, or Firm* — Behmke Innovation Group LLC; Kenneth J. Heywood; Jonathon P. Western

(57) ABSTRACT

In one embodiment, a device uses a classification model to determine whether implementation of a routing change suggested by a predictive routing engine for a network will result in a violation of one or more network policies. The device computes a trust score, based on performance metrics for the classification model. The device causes, based in part on the trust score, implementation of the routing change in the network, when the classification model determines that application of the routing change will not result in a violation of the one or more network policies.

18 Claims, 9 Drawing Sheets

PROGRESSIVE AUTOMATION WITH PREDICTIVE APPLICATION NETWORK ANALYTICS

TECHNICAL FIELD

The present disclosure relates generally to computer networks, and, more particularly, to progressive automation with predictive application network analytics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits.

With the recent evolution of machine learning, predictive failure detection and proactive routing in an SDN/SD-WAN now becomes possible through the use of machine learning techniques. However, the decision to fully automate routing decisions or to keep them manually controlled by a network administrator has largely been a binary decision, with many network administrators remaining leery of ceding control of the network over to a predictive engine. In addition, predictive routing approaches today typically seek only to maximize the potential performance gains in the network without taking into account the risk and negative effects of an incorrect prediction.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
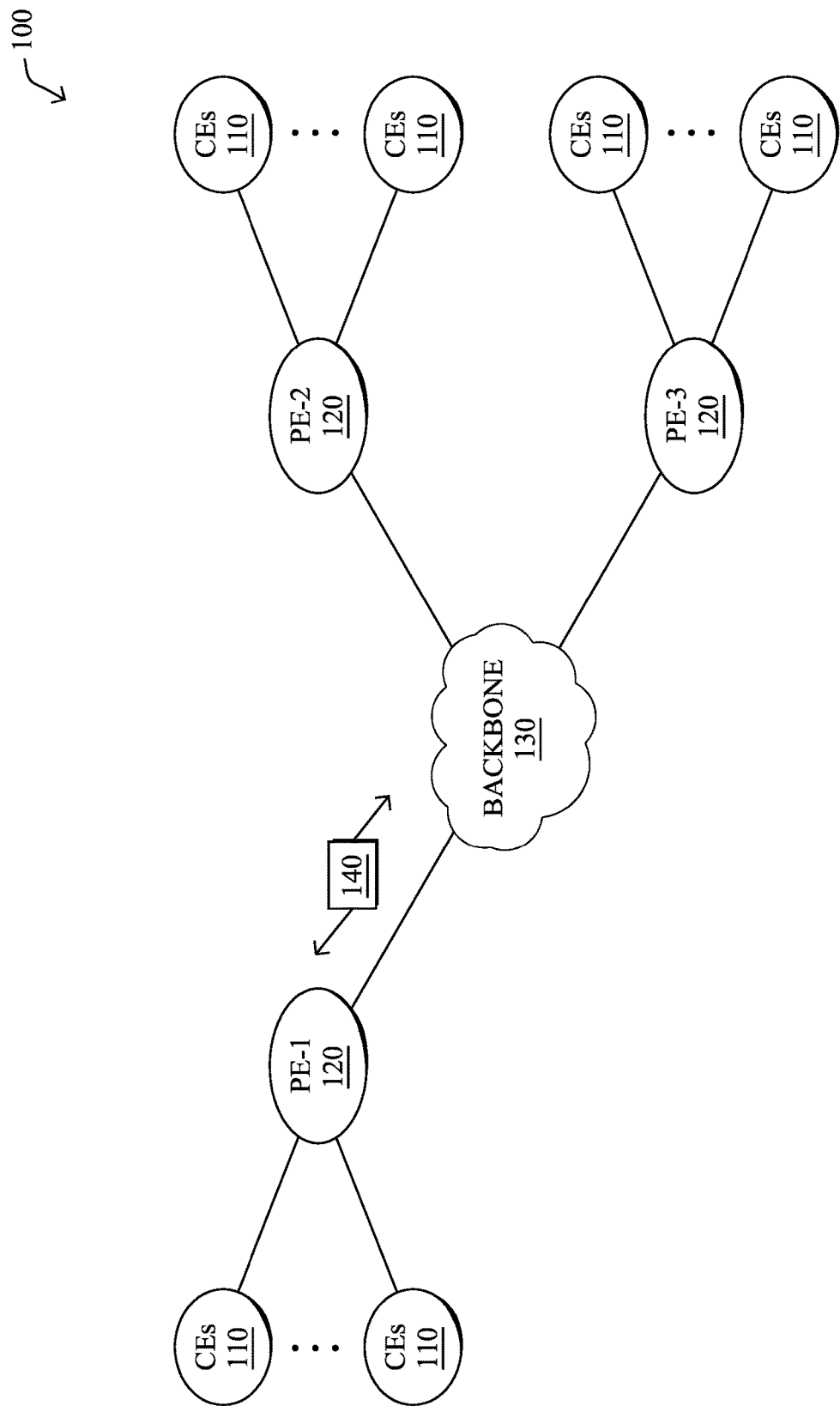
FIGS. 1A-1B illustrate an example communication network.

According to one or more embodiments of the disclosure, a device uses a classification model to determine whether implementation of a routing change suggested by a predictive routing engine for a network will result in a violation of one or more network policies. The device computes a trust score, based on performance metrics for the classification model. The device causes, based in part on the trust score, implementation of the routing change in the network, when the classification model determines that application of the routing change will not result in a violation of the one or more network policies.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
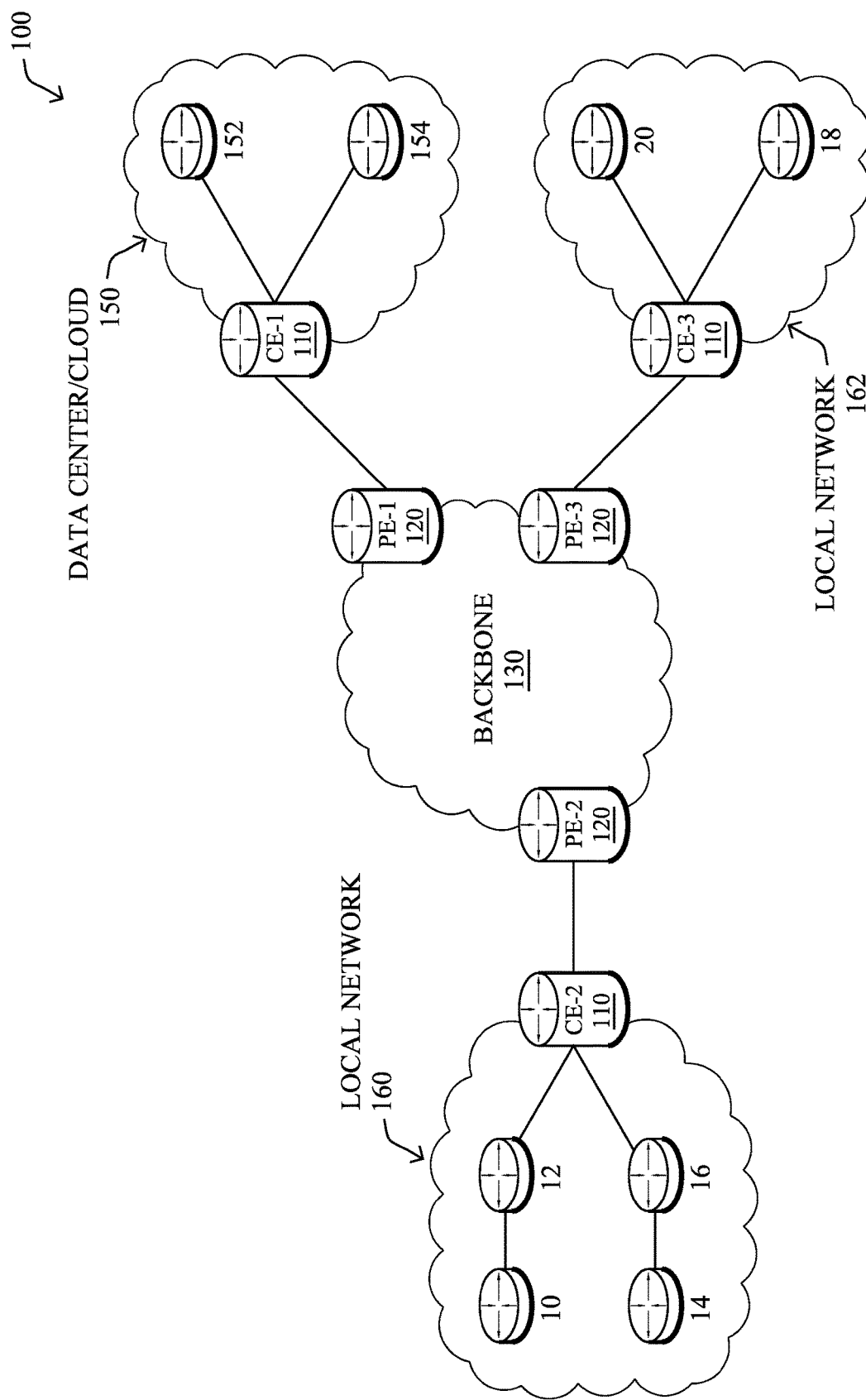

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
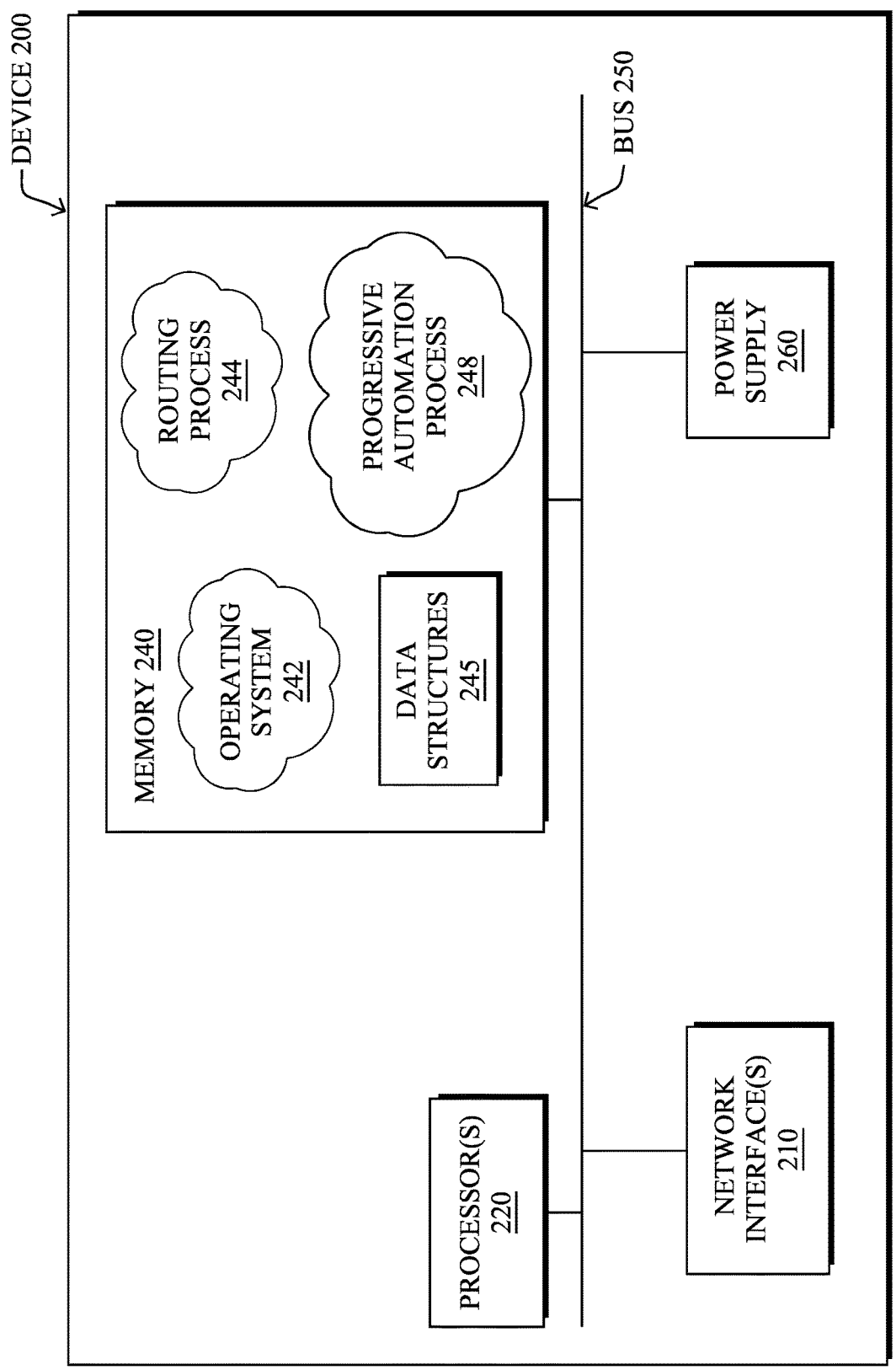
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a progressive automation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or progressive automation process 248 may also include computer executable instructions that, when executed by processor(s) 220, cause device 200 to perform the techniques described herein. To do so, in some embodiments, routing process 244 and/or progressive automation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or progressive automation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or progressive automation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
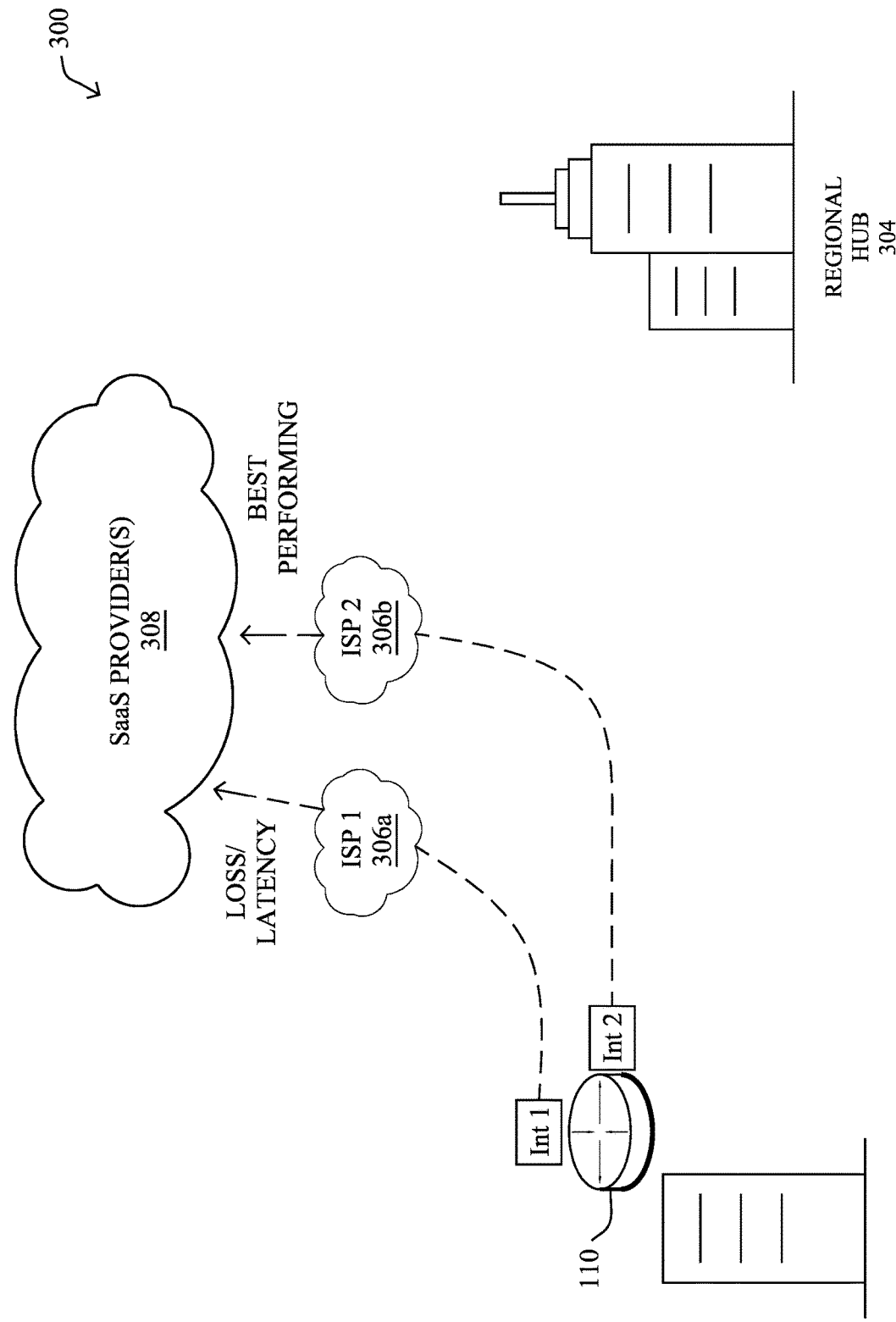
FIGS. 3A-3B illustrate example network deployments.
Figure 3B:
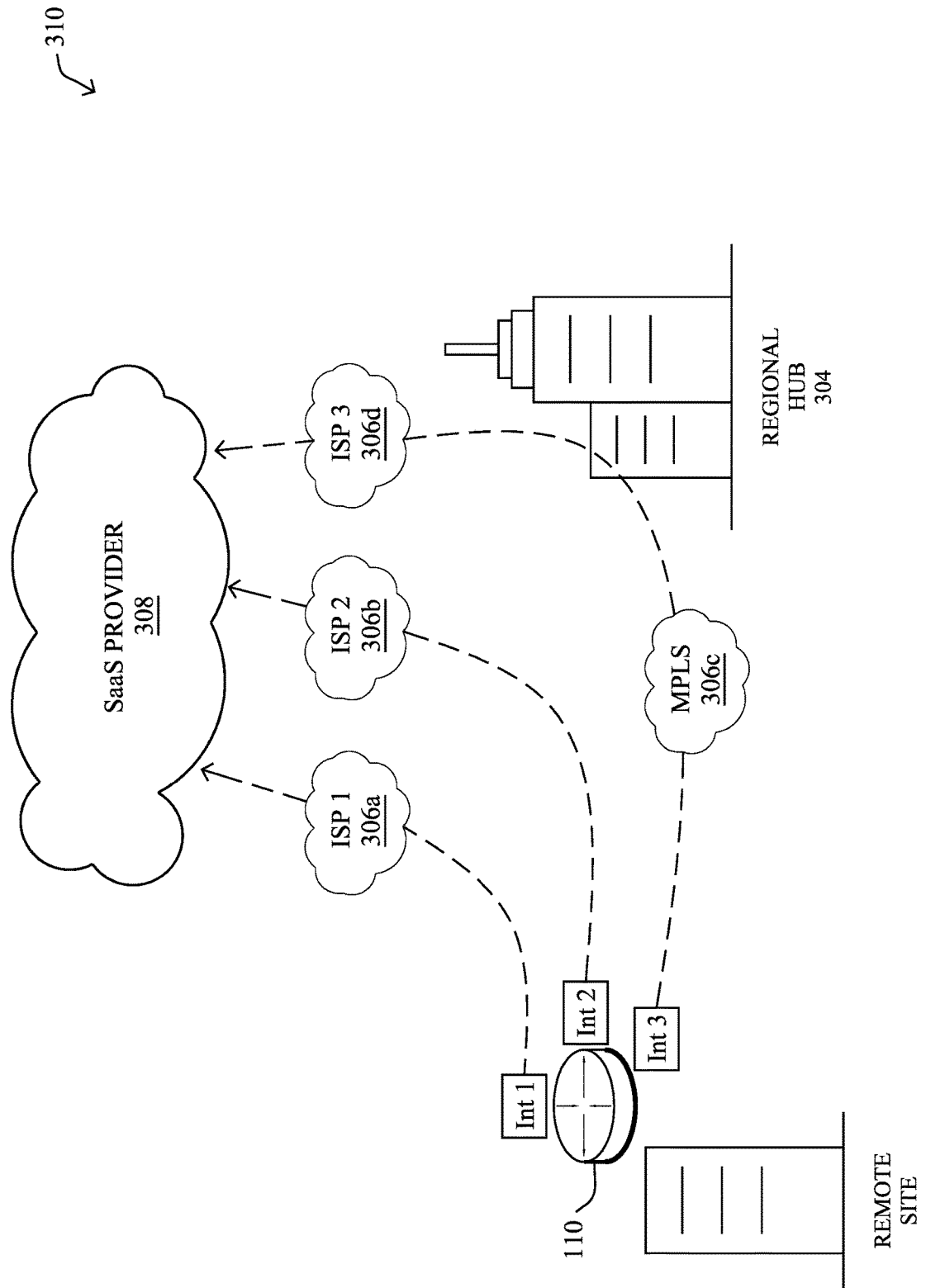

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
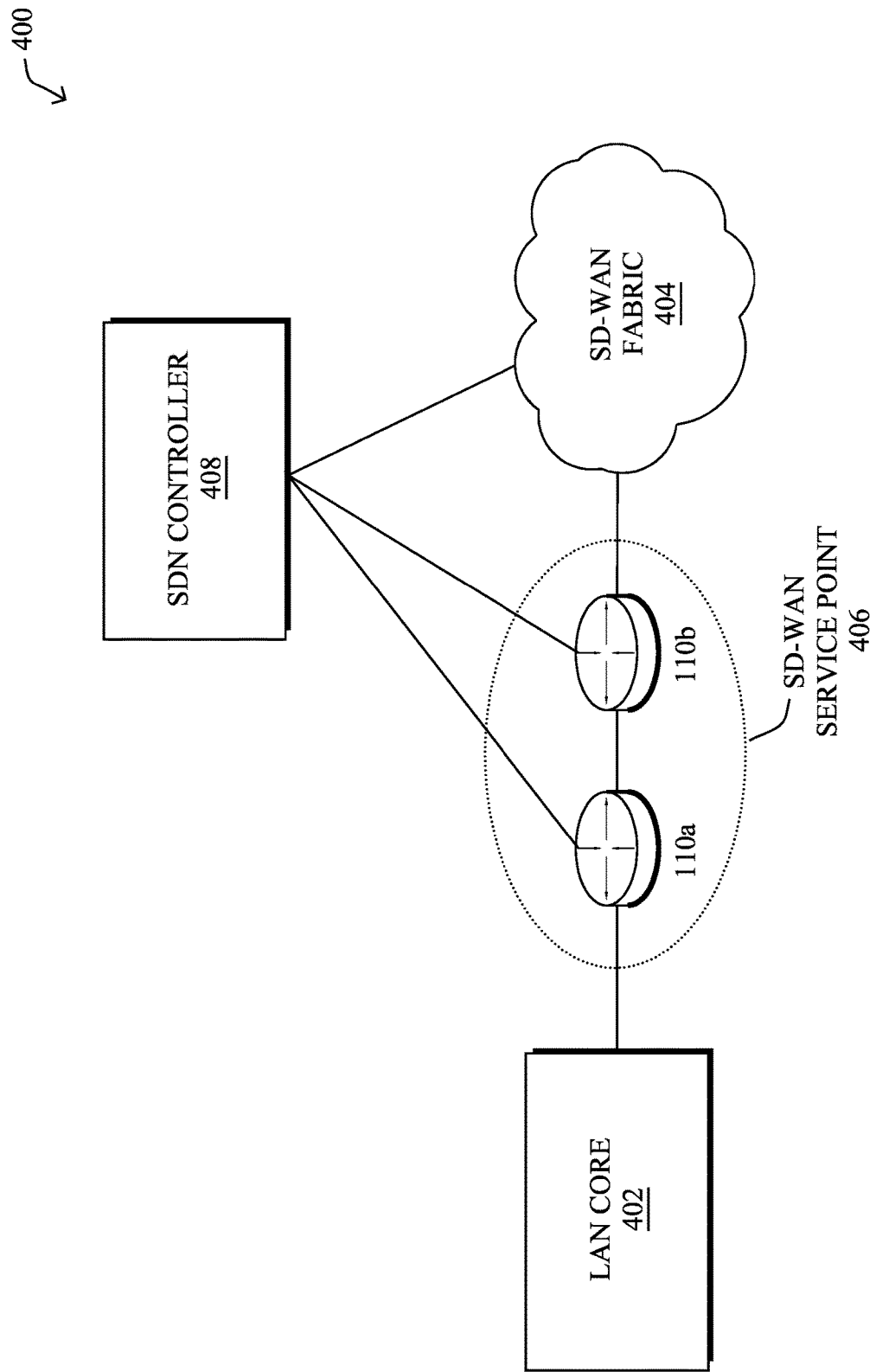
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly shoed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS. LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
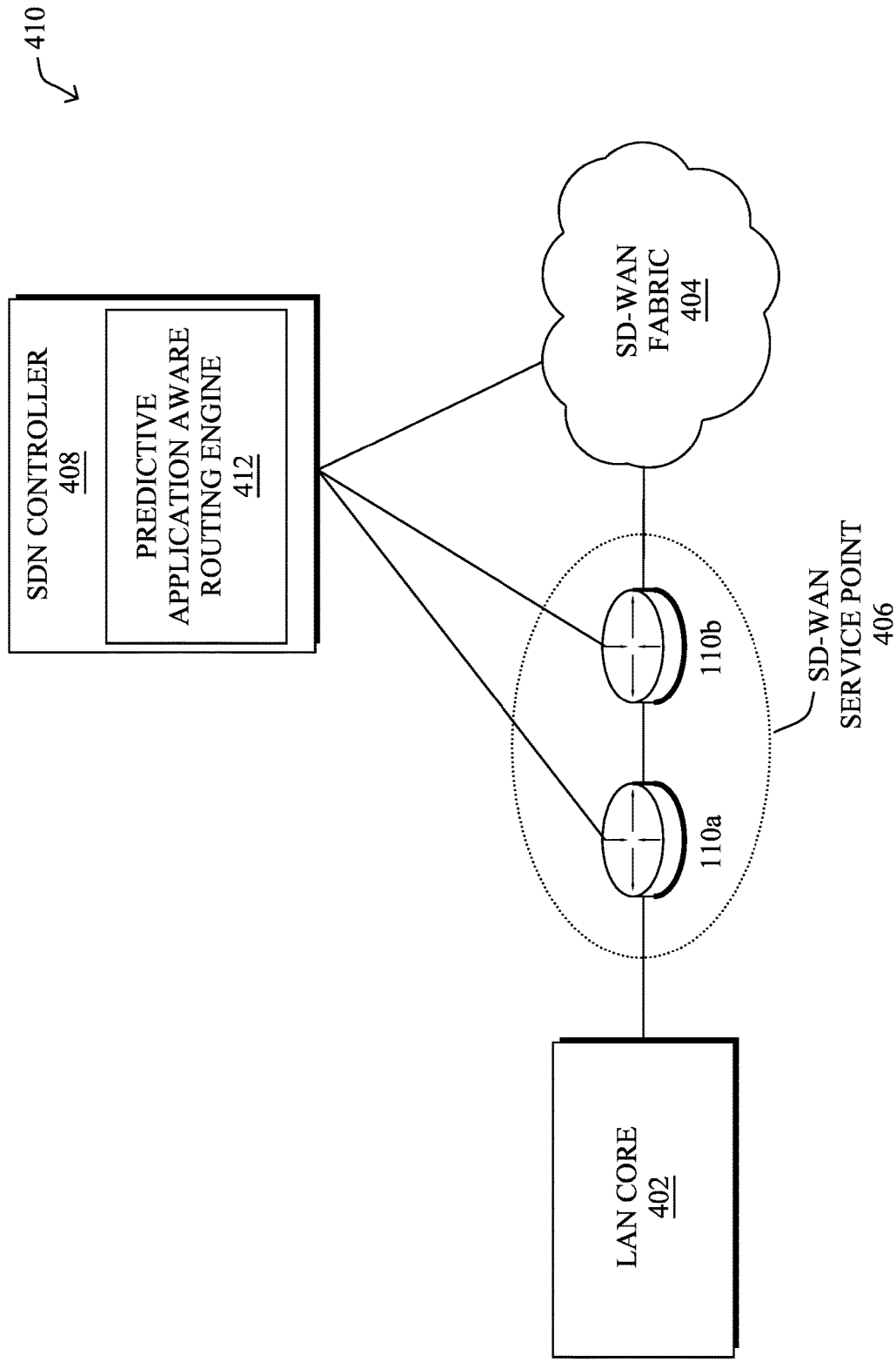

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or progressive automation process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, a predictive routing engine, such as predictive application aware routing engine 412, may provide routing forecasts to avoid application experience disruptions along various paths on the Internet, MPLS, or the like. These forecasts generally take the form of a suggested alternate path to replace a source path, when the engine predicts a disruption along the source path during a specific time window. In turn, the forecasts may drive what are referred to herein as "routing patches," which are configuration changes that are generated automatically based on the forecasts. In some embodiments, these configuration changes can also be optimized to limit fragmentation (e.g., to avoid splitting existing policies into overly complex ones).

In general, the predictive routing engine may produce routing patches when the prediction indicates that traffic could avoid network disruption if it switches to the alternative path. However, in some case, predictions can prove to be incorrect in hindsight: either the change was not necessary, but did not cause any problem either, or the change actually turned to be harmful (e.g., there was more disruption on the alternate than on the source path). Although systems can do their best to reduce such cases, they cannot be completely avoided. In addition, a predictive routing engine can learn that a patch will not help for a given path, but it may not be able to easily generalize this conclusion to similar paths and similar situations.

There can be some pushback against adopting a fully automated routing solution in a production network. Even in cases in which a network administrator is able to review routing patches before they are deployed, this can easily become a tedious task for the administrator. In addition, a network administrator may not be able to properly evaluate the merits of a configuration change, as these are based on past data and forecasting models, and the merit of a configuration change should be evaluated based on statistical confidence and past performance of similar changes in a similar context.

Progressive Automation with Predictive Application Network Analytics

The techniques herein introduce a mechanism to progressively apply more configuration changes to a network as they are proven to be beneficial to the network, focusing in particular on types of changes and contexts that yield the most performance improvements and the least risk. In some embodiments, this can be done downstream of a predictive routing system to act as a meta-model, or partially integrated with predictive routing models directly. In further embodiments, the techniques herein provide for increasing trust levels over time, based on both implicit signals (e.g., actual network performance) and on user-defined policies that specify what is considered acceptable. This allows the system to enforce policies about a posteriori performance (e.g., patches to should save at least X session-minutes of voice, or patches shouldn't be harmful be more than 5%) when selecting patches a priori (e.g., ahead of time, when it is not yet known what the actual patch performance will be, and only a prediction is available), while also taking into account the past performance of the system for similar actions (e.g., routing patches). but also based on the past performance of the system for similar automation actions (patches).

Illustratively, the techniques described herein may be performed by hardware, software, and/or firmware, such as in accordance with progressive automation process 248, which may include computer executable instructions executed by the processor 220 (or independent processor of interfaces 210) to perform functions relating to the techniques described herein (e.g., in conjunction with routing process 244).

Specifically, according to various embodiments, a device uses a classification model to determine whether implementation of a routing change suggested by a predictive routing engine for a network will result in a violation of one or more network policies. The device computes a trust score, based on performance metrics for the classification model. The device causes, based in part on the trust score, implementation of the routing change in the network, when the classification model determines that application of the routing change will not result in a violation of the one or more network policies.

Figure 5:
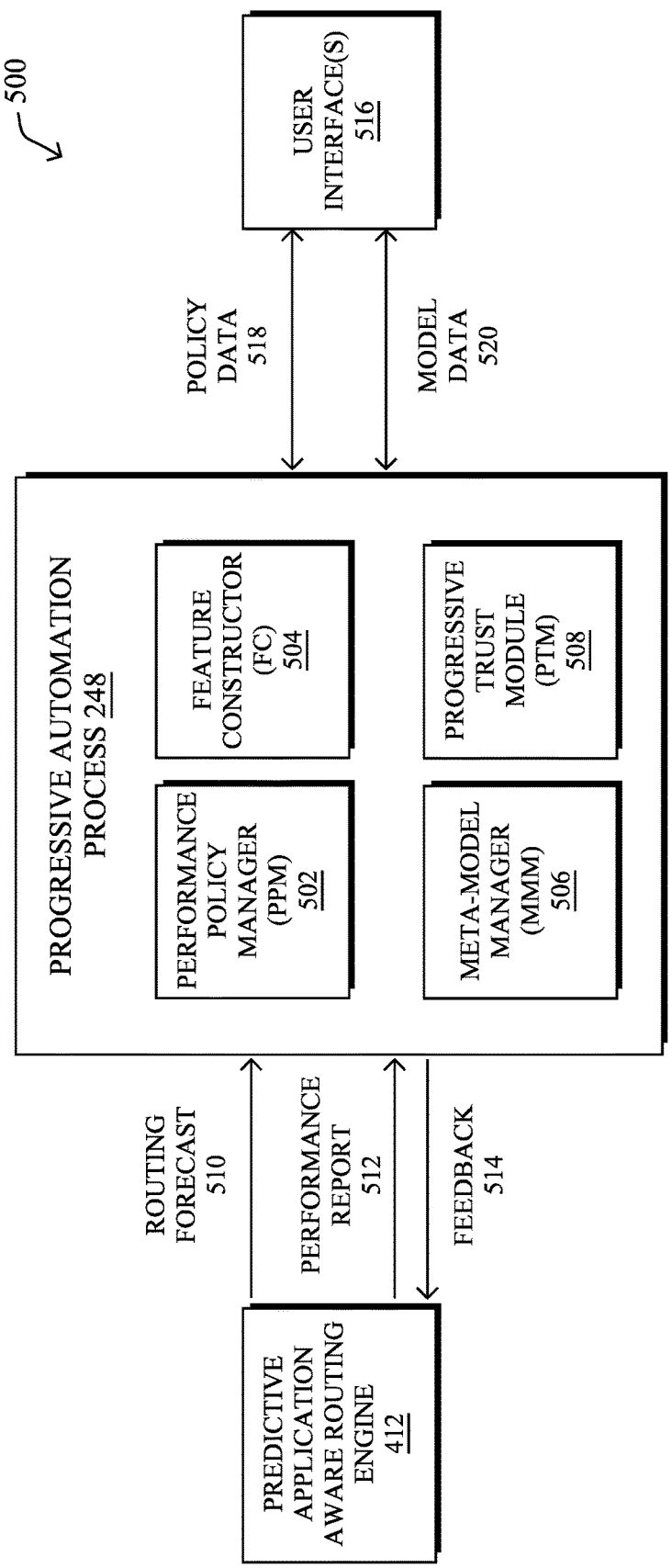
FIG. 5 illustrates an example architecture for progressive automation with predictive application network analytics.

Operationally, FIG. 5 illustrates an example architecture for progressive automation with predictive application network analytics, according to various embodiments. At the core of architecture 500 is progressive automation process 248, which may be executed by a controller for a network or another device in communication therewith. For instance, progressive automation process 248 may be executed by a controller for a network (e.g., SDN controller 408 in FIGS. 4A-4B), a particular networking device in the network (e.g., a router, etc.), another device or service in communication therewith, or the like.

As shown, progressive automation process 248 may include any or all of the following components: a performance policy manager (PPM) 502, a feature constructor (FC) 504, a meta-model manager (MMM) 506, and/or a progressive trust model (PTM) 508. As would be appreciated, the functionalities of these components may be combined or omitted, as desired. In addition, these components may be implemented on a singular device or in a distributed manner, in which case the combination of executing devices can be viewed as their own singular device for purposes of executing progressive automation process 248.

As shown, progressive automation process 248 may operate in conjunction with a predictive routing engine, such as predictive application aware engine 412, described previously. In various embodiments, progressive automation process 248 may be executed by the same device as that executing predictive application aware routing engine 412 or another device in communication therewith. In addition, while progressive automation process 248 is shown as a separate process than that of predictive application aware routing engine 412, their functionalities can be combined or omitted, as desired.

During execution, predictive application aware routing engine 412 may provide a routing forecast 510 to progressive automation process 248 for evaluation. For instance, a routing forecast 510 may take the form of a message according to the following format:

forecastId: <unique ID>
Time window
validity: [2020-04-06 10:00:00, 2020-04-6 11:00:00]
Application/traffic class
appClass: voice
Source path where disruption is expected
sourcePath: {10.1.1.1 "blue"}→{10.2.2.2, "blue"}
Alternate path suggested
alternatePath: {10.1.1.1. "gold"}→{10.2.2.2, "gold"}

In other words, a routing forecast 510 generated by predictive application aware routing engine 412 may indicate when and where a disruption is predicted, as well as a suggested routing change to avoid or mitigate the effects of that disruption.

In addition to routing forecast 510, predictive application aware routing engine 412 may also provide performance reports 512 to progressive automation process 248 for analysis, in some embodiments. In general, a performance report 512 may be associated with a routing forecast (e.g., by indicating its forecastID or other identifier) and indicate a set of performance metrics regarding that forecast. For instance, a performance report 512 may indicate any or all of the following:

The predicted probabilities of disruption or number of sessions on the source and alternate paths.
The actual disruptions and numbers of sessions on the source and alternate paths.
Whether the routing change suggested by the routing forecast was actually implemented in the network or not.
Possibly, additional, application-specific metrics such as application QoE scores when available on the source and alternate paths.

Said differently, predictive application aware routing engine 412 may track and report on its routing forecasts over time, even when a given forecast did not result in a routing change/patch being implemented. In some embodiments, predictive application aware routing engine 412 may use the information in performance reports 512 for training purposes, so as to avoid making the same mistakes multiple times for the same to path (e.g., through the use of reinforcement learning). In turn, progressive automation process 248 may aid in this by generalizing the information between similar situations, thereby reducing the amount of exploration required.

In various embodiments, performance policy manager (PPM) 502 maintains a set of one or more network policies, which may be set by default and/or specified by a user via user interface(s) 516. These policies define what is acceptable a posteriori in terms of actual performance (e.g., the policies apply to the actuals in performance reports, and not to the predictions). For instance, the user may express policy data 518 to PPM 502 using any or all of the following:

Selectors, which indicate in which context the policy should apply. In various instances, policies can be global and apply to all paths and routers, but they can also apply to more specific paths and routers using a system of tag. For instance, policies can apply to all edge routers tagged with a "hub" tag, to apply a specific policy to hub edge devices, as opposed, say, to branch office edge devices. In another example, policies can be restricted to certain application classes (e.g., only to voice traffic).

Constraints, which indicate what is acceptable (e.g., minimum numbers of sessions minutes or fraction of sessions to save during disruptions).

In practice, a user of user interface(s) 516 may not know how to set this. Thus, PPM 502 may maintain default network policies, which can be adjusted via user interface(s) 516 as more data is available and the trust increases. There can also be a template of policies from which the user can choose. For example, there can be policies based on risk-profile of the user (aggressive or conservative).

Another component of progressive automation process 248 may be feature constructor (EC) 504, which is responsible for augmenting performance reports with features to be used by statistical models. In various embodiments, such features may include any or all of the following:
Simple characteristics of the routers) or the site size.
Characteristics of the forecast:
  A confidence score for the forecast
  A frequency of seasonality captured by the forecast (e.g., hourly, daily, weekly, etc.)
  Applications) affected
  Time of day
  Bag of words representation of the main autonomous system (AS) traversed by the source and alternate path
  Geolocation for the source and/or destination of the paths Features will carry the signal, but too many features will make it hard to learn much with small sample sizes when the user does not yet trust the system to apply too many patches/routing changes. Preferably, the features will only use information known at the time of the forecast, nothing from the actuals.

According to various embodiments, progressive automation process 248 may also include meta-model manager (MMM) 506, which is responsible for training and then evaluating a statistical model using the features built by EC 504. In one embodiment, MMM 506 may comprise a classification model trained to map feature vectors from FC 504 to a label that signifies whether a routing forecast (e.g., routing forecast 510) will satisfy the target network policies. If a forecast was applied, MMM 506 may give it more weight, as the resulting information is more reliable (e.g., actual traffic was sent to the alternate path as a result of the forecast, and it worked fine), If a forecast was ultimately not applied (e.g., no reroute was actually implemented as a result of the forecast), MMM 506 may give that forecast less weight.

The classification model of MMM 506 may take various forms. For instance, models such as regularized logistic regression can be used. In such a case, regularized logistic regression would take a set of feature vectors $A\_1, \ldots, A\_m$ corresponding to m past forecasts, as well as labels $b\_1, \ldots, b\_m$ which are +1 when the forecast met the policies, and −1 otherwise, and estimate a weight vector x that minimizes a following loss function, given a specified tuning parameter.

Initially, the model of MMM 506 may be trained primarily on forecasts from predictive application aware routing engine 412 that are not being applied/implemented in the network. Progressively, the fraction of forecasts actually applied will increase. To this end, the model can be retrained regularly using recent forecast performance reports.

In this embodiment, the model outputs a confidence that a forecast will meet the expected policies (output of the classifier), Although in principle some of the modeling could be pushed back to predictive application aware routing engine 412, a meta-model can have operational advantages and allow for sharing information between paths, even if predictive application aware routing engine 412 does per-path modeling.

In another embodiment, MMM 508 may leverage clustering, to identify clusters of similar forecasts. In such a case, a suitable distance function should be used to distinguish clusters. The distance can also be learned or adjusted offline, such as by using cross-deployment data (e.g., data from networks of different entities, etc.), especially data regarding forecasts that were actually applied. A clustering algorithm can be then used to group forecasts into clusters. For a given cluster, MMM 506 may evaluate, using performance reports 512, the fraction of forecasts that meet the expected policies (or a smooth version of that).

Both embodiments above can be rejoined using models such as k-Nearest Neighbor or Locality Sensitive Hashing. In addition, in both embodiments, the models output for new forecasts, for which actuals are not yet known, some form of confidence score that a given routing forecast 510 will meet the policy.

In various embodiments, progressive automation process 248 may also include progressive trust model (PTM) 508, which evaluates the performance of MMM 506 after the fact. In turn, PTM 508 may select a point on the Receiver Operating Curve (ROC) curve, in order to minimize policy violations. PTM 508 then proceeds as follows:
  Consume all performance reports 512 and evaluate whether MMM 506 was correct or not.
  Compute a ROC curve and select a threshold. For instance, this can This can be done by imposing a maximum false positive fraction. In addition, the criterion can be adjusted based on the sample size used to evaluate the model, Indeed, as the system has more and more forecasts actually applied, the effective sample size computed with weight will increase, and the model may be considered as more reliable. Thus, the trust score increases as more routing changes/patches are applied that MMM 506 is able to correctly classify. In another embodiment, the threshold used by PTM 508 can be adjusted based on a risk profile for a user of user interface(s) 516. For instance, a conservative user may pick a threshold where the false positive rate is low, knowing that the true positive rate will also be low. Conversely, a more aggressive user may pick a higher false positive rate.
  Based on the threshold, filter out routing forecasts where MMM 506 is unable to correctly predict the outcome.

In other words, in some embodiments, PTM 508 may impose the following conditions on routing forecast 510 actually leading to a routing change/patch being implemented in the network: 1.) MMM 506 must predict/classify routing forecast 510 as not violating a network policy maintained by PPM 502 and 2.) the trust score computed by PTM 508 exceeds a defined threshold. If both conditions are met, PTM 508 may then cause the routing change(s)/patch(es) to be implemented in the network. For instance, PTM 508 may provide feedback 514 to predictive application aware routing engine 412 that causes it to implement the change. Alternatively, progressive automation process 248 may directly notify the affected routers).

If routing forecast 510 does not meet the conditions of PTM 508, PTM 508 may instead opt to filter out routing forecast 510 from being applied. In such a case, predictive application aware routing engine 412 may still report, via performance reports 512, on how routing forecast 510 would have performed. For instance, even if routing forecast 510 was filtered out from affecting the network, performance reports 512 may indicate whether the disruption predicted by routing forecast 510 was observed, etc. Such information can be used by MMM 506 to further enhance its classifications and, as is a result, may increase the trust score computed by PTM 508 over time.

In some embodiments, another function of progressive automation process 248 may be to provide model data 520 to user interface(s) 516 that allow users to inspect the decisions of MMM 506 in an interpretable manner. In the case of MMM 506 using a clustering model, for instance, the clusters can be summarized based on common attributes, or by showing a few sample forecasts from the cluster. In the case of MMM 506 comprising a classification model, model inspection can be more difficult. However, techniques for model interpretability can still be used to extract salient features and included in model data 520, when the model is simple enough. As would be appreciated, in cases in which progressive automation process 248 is integrated with predictive application aware routing engine 412, user interface(s) 516 may also be shared with predictive application aware routing engine 412, allowing users to inspect the routing forecasts and their outcomes in details.

Figure 6:
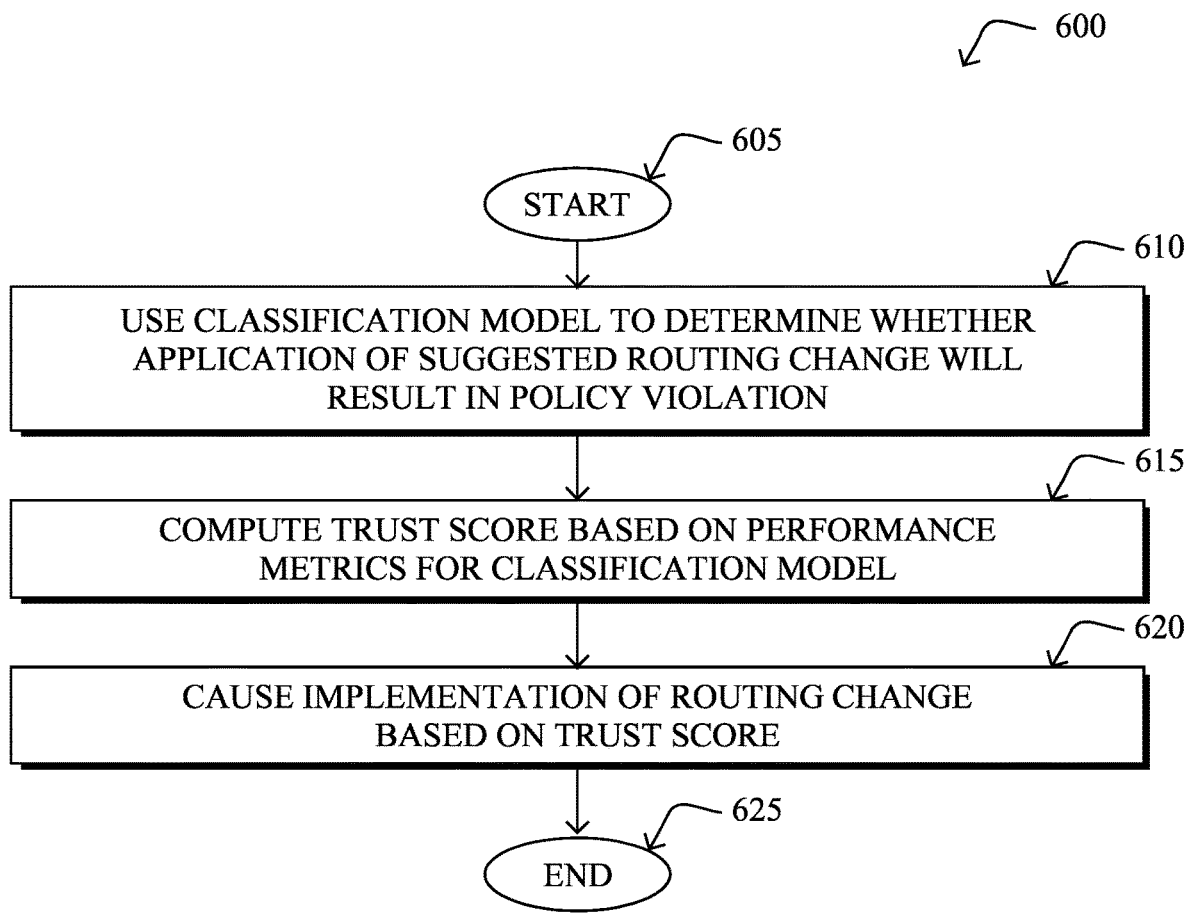
FIG. 6 illustrates an example simplified procedure for implementing a suggested routing change in a network.

FIG. 6 illustrates an example simplified procedure 600 for implementing a suggested routing change in a network, in accordance with one or more embodiments described herein. For example, a non-generic, specifically configured device (e.g., device 200), such as controller for a network (e.g., an SDN controller or other device in communication therewith), may perform procedure 600 by executing stored instructions (e.g., routing process 244/and/or progressive automation process 248). The procedure 600 may start at step 605, and continues to step 610, where, as described in greater detail above, the device may use a classification model to determine whether implementation of a routing change suggested by a predictive routing engine for a network will result in a violation of one or more network policies. In various embodiments, the routing change may be indicative of a predicted disruption along a first path in the network and a second path to which traffic sent via the first path should be rerouted. In some instances, the one or more network policies may specify a level of performance for the network when there is a predicted disruption in the network (e.g., a number of sessions to save during a disruption, etc.). In further embodiments, the classification model may make its determination based in part on a similarity between the routing change and a cluster of is other routing changes previously suggested by the engine. Information about that cluster may also be sent to a user interface, thereby providing some insight to a network administrator or other user. For instance, the classification model may rely on features such as the application(s) associated with a given routing change, a time of day during which that change is suggested to be implemented, a geolocation associated with the change, or the like.

At step 615, as detailed above, the device may compute a trust score based on performance metrics for the classification model. In general, the performance metrics may be indicative of false positives of the classification model, accuracy of the model, or other metrics indicative of how well the classification model is able to correctly predict whether a given routing change suggested by the predictive routing engine will result in a policy violation. In various embodiments, the classification model may be trained at least in part on suggested routing changes that were not actually implemented in the network. This allows the classification model to assess both implemented and unimplemented routing changes suggested by the predictive routing engine. Presumably, as more data points are gathered, the trust score will increase over time.

At step 620, the device may cause implementation of the routing change in the network, based in part on the trust score, when the classification model determines that application of the routing change will not result in a violation of the one or more network policies, as described in greater detail above. For instance, the device may provide feedback to the predictive routing engine, which then pushes a corresponding configuration change(s)/patch(es) to the affected router(s). Alternatively, the device may push the routing patch(es) to the router(s), directly. As would be appreciated, as the trust score increases over time, the number of routing changes suggested by the predictive routing engine and actually implemented will also increase, accordingly. Procedure 600 then ends at step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the progressive adoption of predictive routing changes to be implemented in a network, automatically. In some aspects, the techniques herein introduce a (meta)modeling approach that monitors the performance of routing changes suggested by a predictive routing engine, so as to quantify a degree of trust with the system. Doing so allows a network administrator to decide when the system can be trusted to take automatic control over routing decisions and under which circumstances.

While there have been shown and described illustrative embodiments that provide for the progressive automation of a network with predictive application network analytics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the is embodiments herein. Therefore, it is the object of the appended claims to cover all such variations and modifications as come within the true spirit and scope of the embodiments herein.

The invention claimed is:

1. A method comprising:
using, by a device, a classification model to determine whether implementation of a routing change suggested by a predictive routing engine for a network will result in a violation of one or more network policies;
computing, by the device, a trust score, based on performance metrics for the classification model;
causing, by the device and based in part on the trust score, implementation of the routing change in the network, when the classification model determines that application of the routing change will not result in a violation of the one or more network policies; and
increasing, by the device, a number of routing changes suggested by the predictive routing engine that are implemented in the network, based on a corresponding increase in the trust score.

2. The method as in claim 1, wherein the routing change suggested by the predictive routing engine is indicative of a predicted disruption along a first path in the network and a second path to which traffic sent via the first path should be rerouted.

3. The method as in claim 1, wherein the one or more network policies specify a level of performance for the network when there is a predicted disruption in the network.

4. The method as in claim 1, wherein the classification model determines whether implementation of the routing change will result in a violation of the one or more network policies based in part on a similarity between the routing change and one or more other routing changes previously suggested by the predictive routing engine.

5. The method as in claim 1, further comprising:
training, by the device, the classification model using training data indicative of whether routing changes suggested by the predictive routing engine would have resulted in a violation of the one or more network policies.

6. The method as in claim 5, wherein at least some of the routing changes were not implemented in the network.

7. The method as in claim 1, wherein the classification model determines whether implementation of the routing change will result in a violation of the one or more network policies based in part on a similarity between the routing change and a cluster of routing changes previously suggested by the predictive routing engine.

8. The method as in claim 7, further comprising:
providing, by the device and to a user interface, data regarding the cluster of routing changes.

9. The method as in claim 1, wherein the classification model takes as input one or more features of the routing change comprising at least one of: an application associated with the routing change, a time of day during which the routing change is suggested to be implemented, or a geolocation associated with the routing change.

10. An apparatus, comprising:
one or more network interfaces;
a processor coupled to the one or more network interfaces and configured to execute one or more processes; and
a memory configured to store a process that is executable by the processor, the process when executed configured to:
use a classification model to determine whether implementation of a routing change suggested by a predictive routing engine for a network will result in a violation of one or more network policies;
compute a trust score, based on performance metrics for the classification model;
cause, based in part on the trust score, implementation of the routing change in the network, when the classification model determines that application of the routing change will not result in a violation of the one or more network policies; and
increase a number of routing changes suggested by the predictive routing engine that are implemented in the network, based on a corresponding increase in the trust score.

11. The apparatus as in claim 10, wherein the routing change suggested by the predictive routing engine is indicative of a predicted disruption along a first path in the network and a second path to which traffic sent via the first path should be rerouted.

12. The apparatus as in claim 10, wherein the one or more network policies specify a level of performance for the network when there is a predicted disruption in the network.

13. The apparatus as in claim 10, wherein the classification model determines whether implementation of the routing change will result in a violation of the one or more network policies based in part on a similarity between the routing change and one or more other routing changes previously suggested by the predictive routing engine.

14. The apparatus as in claim 10, wherein the process when executed is further configured to:
train the classification model using training data indicative of whether routing changes suggested by the predictive routing engine would have resulted in a violation of the one or more network policies.

15. The apparatus as in claim 14, wherein at least some of the routing changes were not implemented in the network.

16. The apparatus as in claim 10, wherein the classification model determines whether implementation of the routing change will result in a violation of the one or more network policies based in part on a similarity between the routing change and a cluster of routing changes previously suggested by the predictive routing engine.

17. The apparatus as in claim 16, wherein the process when executed is further configured to:
provide, to a user interface, data regarding the cluster of routing changes.

18. A tangible, non-transitory, computer-readable medium storing program instructions that cause a device to execute a process comprising:
using, by the device, a classification model to determine whether implementation of a routing change suggested by a predictive routing engine for a network will result in a violation of one or more network policies;
computing, by the device, a trust score, based on performance metrics for the classification model;
causing, by the device and based in part on the trust score, implementation of the routing change in the network, when the classification model determines that application of the routing change will not result in a violation of the one or more network policies; and increasing, by the device, a number of routing changes suggested by the predictive routing engine that are implemented in the network, based on a corresponding increase in the trust score.

* * * * *

UNITED STATES PATENT AND TRADEMARK OFFICE
CERTIFICATE OF CORRECTION

PATENT NO. : 11,711,291 B2
APPLICATION NO. : 17/238440
DATED : July 25, 2023
INVENTOR(S) : Jean-Philippe Vasseur et al.

Page 1 of 2

It is certified that error appears in the above-identified patent and that said Letters Patent is hereby corrected as shown below:

In the Specification

Column 8, Line 37, please amend as shown:
siloed. More specifically, the network is usually designed in Column 9, Line 8, please amend as shown:
Internet, MPLS, LTE transports providing highly varying Column 9, Line 22, please amend as shown:
routing protocols (ISIS, OSPF, etc.) using various metrics Column 9, Line 40, please amend as shown:
QoE by sending HyperText Transfer Protocol (HTTP) probes Column 11, Line 16, please amend as shown:
(e.g., patches should save at least X session-minutes of Column 12, Line 17, please amend as shown:
validity: [2020-04-06 10:00:00, 2020-04-06 11:00:00]

Column 12, Line 21, please amend as shown:
sourcePath: {10.1.1.1, "blue"} -> {10.2.2.2, "blue"}

Column 12, Line 23, please amend as shown:
alternatePath: {10.1.1.1, "gold"} -> {10.2.2.2, "gold"}

Column 12, Line 55, please amend as shown:
times for the same path (e.g., through the use of rein- Signed and Sealed this
Fourteenth Day of November, 2023

Katherine Kelly Vidal
*Director of the United States Patent and Trademark Office*

Column 13, Line 22, please amend as shown:
248 may be feature constructor (FC) 504, which is respon- Column 13, Line 26, please amend as shown:
Simple characteristics of the router(s) or the site size.

Column 13, Line 31, please amend as shown:
Application(s) affected

Column 13, Line 47, please amend as shown:
evaluating a statistical model using the features built by FC Column 13, Line 55, please amend as shown:
forecast, and it worked fine). If a forecast was ultimately not Column 14, Line 9, please amend as shown:
classifier). Although in principle some of the modeling could Column 14, Line 41, please amend as shown:
instance, this can be done by imposing a Column 14, Line 44, please amend as shown:
evaluate the model. Indeed, as the system has more and Column 15, Line 4, please amend as shown:
may directly notify the affected router(s).

Column 15, Line 15, please amend as shown:
tions and, as a result, may increase the trust score Column 15, Line 57, please amend as shown:
routing change and a cluster of other routing changes Column 17, Line 4, please amend as shown:
embodiments herein. Therefore, it is the object of the